(12) United States Patent
Smith

(10) Patent No.: US 7,489,928 B2
(45) Date of Patent: Feb. 10, 2009

(54) ADAPTIVE RF LINK FAILURE HANDLER

(76) Inventor: Brian K. Smith, 4133 Bahia Isle Cir., Wellington, FL (US) 33467

(*) Notice: Subject to any disclaimer, the term of this patent is extended or adjusted under 35 U.S.C. 154(b) by 300 days.

(21) Appl. No.: 10/334,472

(22) Filed: Dec. 31, 2002

(65) Prior Publication Data
US 2004/0203441 A1   Oct. 14, 2004

(51) Int. Cl.
H04Q 7/20 (2006.01)

(52) U.S. Cl. .................. 455/432.1; 455/437

(58) Field of Classification Search .......... 455/437, 455/444, 522, 432–435, 441, 440, 436, 69, 455/404.2, 439, 442
See application file for complete search history.

(56) References Cited

U.S. PATENT DOCUMENTS

| | | | |
|---|---|---|---|
| 5,432,842 A | 7/1995 | Kinoshita et al. | |
| 5,826,188 A | 10/1998 | Tayloe et al. | |
| 6,038,444 A | 3/2000 | Schipper et al. | |
| 7,113,793 B2* | 9/2006 | Veerasamy et al. | 455/456.1 |
| 2002/0090965 A1* | 7/2002 | Chen et al. | 455/522 |
| 2003/0050064 A1* | 3/2003 | Davies et al. | 455/441 |
| 2003/0125028 A1* | 7/2003 | Reynolds | 455/437 |
| 2003/0129979 A1* | 7/2003 | Cooper | 455/432 |
| 2004/0097234 A1* | 5/2004 | Rajkotia et al. | 455/442 |

* cited by examiner

Primary Examiner—Tu X Nguyen
(74) Attorney, Agent, or Firm—Brinks Hofer Gilson & Lione (57) ABSTRACT

A method for preventing radio frequency (RF) link failures in a radio telecommunication network. The network includes at least one base station (402) and at least one subscriber unit (SU) (406) which are capable of sending and receiving RF link signals. The method provides for monitoring the RF link between the base station (402) and the SU (406) and determining if the RF link is failing (216), and if so, taking corrective action to maintain the RF Link. The method provides for storing information about the RF Link failure and the corrective action taken (224) and utilizes the corrective action taken in prior RF Link failures to prevent future RF Link failures. The method provides for determining that an old corrective action for improving the RF Link channel quality no longer improves the RF Link channel quality and, therefore, provides for discarding the old corrective action in favor of a new corrective action (234).

14 Claims, 5 Drawing Sheets

ADAPTIVE RF LINK FAILURE HANDLER

BACKGROUND

1. Technical Field

The present invention relates generally to radio telecommunication networks. More specifically, the present invention relates to the prevention and elimination of radio frequency (RF) link failures in a radio telecommunication network through an adaptive failure handling algorithm.

2. Background Information

In a radio telecommunication network a subscriber unit (SU) is able to communicate with the telecommunication network through the use of radio frequency (RF) signals. The radio telecommunication network includes a plurality of RF transceivers or base stations and a plurality of RF SU's. The SU's utilize a RF link to register with, and maintain connection to, the telecommunication network.

The present radio telecommunication networks suffer from areas of poor RF signal strength which can cause the RF link between a SU and a base station to fail. Such RF link failures occur when the voice or data quality of the SU is unacceptable and cannot be improved by RF power control or by a hand off from one base station to another.

Environmental conditions can cause RF link failures due to loss of RF coverage or excessive co-channel interference or a combination of both. Such RF link failures due to loss of RF coverage or excessive co-channel interference or a combination of both can be caused by natural or man-made environmental conditions.

Such environmental conditions can include open areas, flat areas, hilly areas, mountainous areas, buildings, houses, bridges, tunnels, rural areas, quasi-suburban areas, suburban areas and urban areas as well as combinations of the above. The above environments can cause long term fading, local-mean attenuation and fluctuations as well as short term or transitory fluctuations in RF signal strength. Many RF link failures are transitory in nature. One example of a RF link failure may be in an urban environment with many buildings where merely turning a corner can result in as much as a 30 dB loss in the RF signal strength.

When a RF link failure occurs the SU scans for an available channel or frequency to re-establish the RF link and to re-register with the network. If the RF link failure was transitory the SU will likely re-establish the RF link using the same frequency or channel. Such scanning and re-registering is undesirable because it requires additional power for the repeated scanning and re-registration which can rapidly drain the SU's batteries and decrease network capacity. In addition to the undesirable effects on battery life and network capacity, if RF link failure occurs when the SU has a call in progress, the call may have to be placed again.

The present invention seeks to increase the satisfaction of radio telecommunication network subscribers and the efficiency of the network by minimizing the number and duration of RF link failures which also decreases the demands on both the SU's battery life as well as the network's capacity.

DETAILED DESCRIPTION OF THE DRAWINGS AND THE PRESENTLY PREFERRED EMBODIMENTS

The present invention utilizes an adaptive RF link failure handler algorithm and various memory elements to allow SU's to adapt to their RF environments. A failing or failed RF link is stored in memory as an event. The adaptive RF link failure handler keeps track of the type of event that occurred, the date of the last occurrence of an event, the frequency of occurrence of an event and whether the state of the event is learning or adapting.

The disclosed system and method also keeps track of information such as a SU's location, speed and direction when an event occurs. The algorithm then utilizes a SU's location, speed and direction to determine what corrective action to take when an event occurs. The adaptive RF link failure handler also keeps track of the corrective action taken for an event so that over time only corrective actions that prevent or remedy the event are maintained.

By keeping track of the above data the adaptive RF link failure handler algorithm allows for statistical analysis of RF coverage problems in heavily used areas, patching "holes" in RF coverage, reduction in the amount of time a SU is off-line from a base station, minimization of handoffs from one base station to another, decreasing scanning which thereby increases battery life, and reducing the number of dropped calls.

A SU's location may be determined by the SU or by a base station or a combination of both. A system that utilizes data from both a SU and a base station in order to minimize the time required to determine location is preferred. Systems that utilize data from both a SU and a base station to rapidly determine location include systems known as Assisted Global Positioning Systems.

If the system or SU is provided with the SU's location information as well as the time, the SU's velocity and direction may be easily calculated. If the SU determines that the RF link is failing or has failed, the adaptive RF link failure handler is able to use the location, velocity and direction of the SU to determine what corrective action to take to maintain or re-establish the RF link.

An RF link failure occurs when the quality of the signal for voice or data has degraded to an unacceptable level. The unacceptable signal quality level may be a poor or a nonexistent signal. The quality of the signal may be measured by a variety of channel metrics including carrier to interference plus noise ratio (C/I+N), bit error rate (BER), frame error rate (FER), synchronization error rate (SER), received signal strength indicator (RSSI) and the like as are well known in the art. The determination that an RF link is failing or has failed may be based on one or more of the above measurements.

The adaptive RF link failure handler algorithm stores in the memory elements the locations where the RF link between a base station and a SU were failing or had failed. When a SU approaches a location contained in a memory element the number of failure opportunities is incremented. If a RF link then begins to fail or fails at the location contained in memory then the number of failures is incremented.

The adaptive RF link failure handler algorithm also stores in the memory elements the actions taken when an RF link begins to fail. Such actions can include waiting for the SU to move to another location before attempting to resume the RF link on the present channel, switching to another channel and the like.

The adaptive RF link failure handler algorithm also compares the event and the action taken to determine if there is a new event or action. If an event or action is new and the frequency of the event becomes significant the information related to the event can be transmitted to a base station. Alternatively, the information related to every event can be transmitted to a base station as the events occur without regard to whether the event is new and frequent enough to be considered significant.

If the event is not new and the adaptive RF link failure handler algorithm is adapting its response to the event and the frequency of the event becomes insignificant the information related to the event can be transmitted to a base station. Alternatively, the information related to every event can be transmitted to a base station as the event occurs without regard to whether the event is not new or the frequency of its occurrence decreases enough so that the event is considered to be insignificant.

By transmitting RF link failure information to a base station the information can be centrally collected and analyzed. Once analyzed, the proper corrective action to be taken for a given event can be transmitted by the base station to any SU's already in the event area as well as any SU's near or entering the event area. The base station can then add, change or remove data transmitted to SU's based on event related data received from the SU's. Additionally, the base station can analyze the data it receives to determine what, if any, RF coverage problems exist in the base station's coverage area.

As a SU approaches an area with RF coverage problems the SU will monitor channel quality. If the channel quality deteriorates or fails the SU will determine whether to coordinate with the base station. If the SU determines that communication with the base station is desirable, the SU will notify the base station that the SU is approaching an area with RF coverage problems. Once this is done the SU may initiate the corrective action transmitted back to it from the base station. Alternatively, the SU may initiate corrective action that it has learned and memorized from encountering the problem area before. The base station may then evaluate the corrective action taken by the SU, and if necessary, override the decision made by the SU by issuing instructions to initiate a new corrective action. If the base station does not override the corrective action taken by the SU then both the base station and the SU initiate the corrective action.

Alternatively, the information related to events may not be transmitted to a base station. If the channel quality deteriorates or fails the SU will initiate the corrective action that it has learned and memorized from encountering the problem area before.

When an action initiated by the SU fails to improve or reestablish the RF link, a new memory element is populated with the failure information. The SU then attempts new actions to improve or reestablish the RF link. This is the learning process. Once an action is found that will improve or reestablish the RF link the SU saves in the new memory element the type of action taken to resolve the problem. Eventually, the old action is deleted from memory in favor of a newer and improved action to improve or reestablish the RF link.

Figure 1:
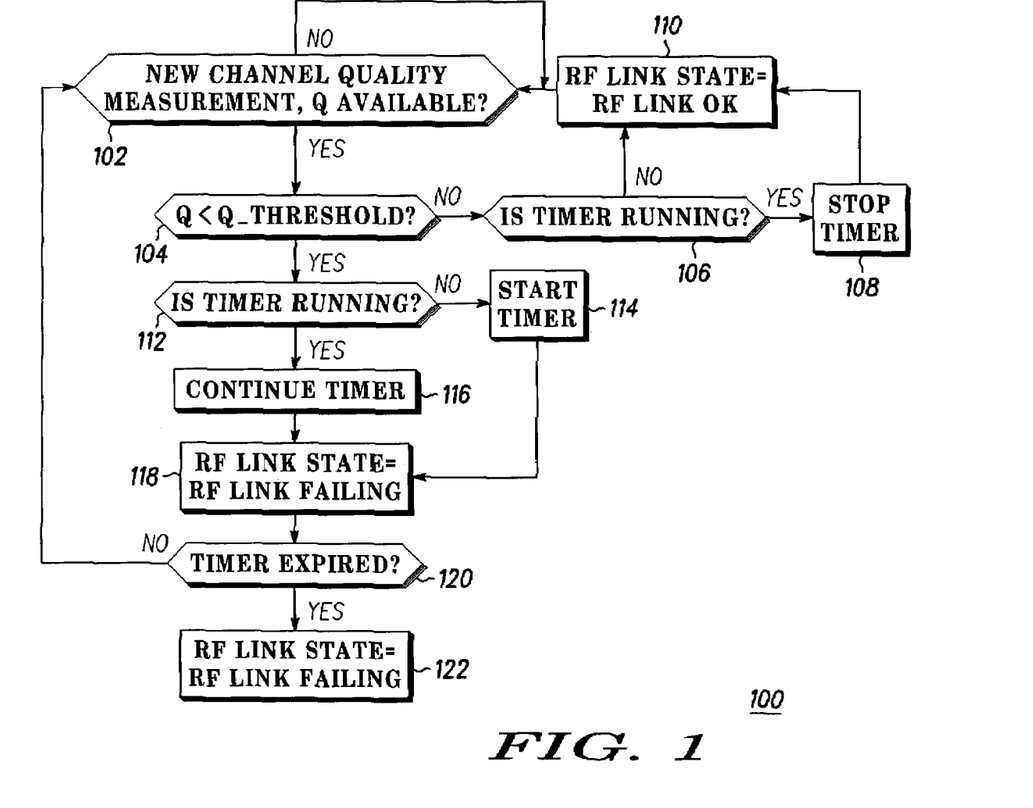
FIG. 1 is a flow chart for an adaptive RF link failure handler algorithm showing the link failure decision process.

FIG. 1 represents a flow chart of the decision process for handling a RF link failure 100 by an adaptive RF link failure handler in accordance with one embodiment. In one embodiment the adaptive RF link failure handler is contained in a SU, in another embodiment the adaptive RF link failure handler is contained in a base station, and in yet another embodiment the adaptive RF link failure handler is contained in both a base station and a SU as is described below in conjunction with FIG. 5. The process of FIG. 1 may be configured as computer readable code operating on a processor of a SU, a base station, or a combination of a SU and base station.

To determine if a RF link failure 100 is occurring, or has occurred, a new channel quality measurement (Q), block 102, must be available. If a new Q, block 102, is not available then the adaptive RF link failure handler waits until a new Q, block 102, is available. Once a new Q, block 102, is available the adaptive RF link failure handler determines whether the Q, block 102, is below a channel quality threshold (Q_Threshold) 104. The Q_Threshold, block 104, can be set to any value. In an embodiment the Q_Threshold, block 104, is set to correspond to a poor RF Link signal. In another embodiment the Q_Threshold, block 104, is set to correspond to the lack of an RF Link signal.

The quality of the signal, or Q, block 102, may be measured by a variety of channel metrics including carrier to interference plus noise ratio (C/I+N), bit error rate (BER), frame error rate (FER), synchronization error rate (SER), received signal strength indicator (RSSI) and the like as are well known in the art. The channel quality metric (Q) may be constructed using any combination of these well known metrics.

If the Q_Threshold, block 104, is not below Q, block 102, then an adaptive RF link failure handler determines whether a timer is running, block 106. If the timer is running, block 106, and Q, block 102, is not below Q_Threshold, block 104, then the adaptive RF link failure handler stops the timer, block 108. Once the timer is stopped, block 108, the adaptive RF link failure handler determines that the state of the RF Link is that the RF Link is OK, block 110, and waits for a new Q, block 102. If, however, the timer in not running, block 106, then the adaptive RF link failure handler merely determines that the state of the RF Link is that the RF Link is OK, block 110, and waits for a new Q, block 102.

If the adaptive RF link failure handler determines the Q, block 102, is below the Q_Threshold, block 104, then the adaptive RF link failure handler determines whether a timer is running, block 112. If the adaptive RF link failure handler determines the timer is not running, block 112, then the adaptive RF link failure handler starts a timer, block 114. If the adaptive RF link failure handler determines the timer is running, block 112, then the adaptive RF link failure handler allows the timer to continue, block 116. Once the adaptive RF link failure handler determines the timer is running, block 112, or determines the timer is running and allowed to continue to run, block 116, then the adaptive RF link failure handler determines that the state of the RF Link is that the RF Link is Failing, block 118.

Once the adaptive RF link failure handler determines that RF Link is Failing, block 118, then the adaptive RF link failure handler determines whether the timer has expired, block 120. If the timer has not expired, block 120, then the adaptive RF link failure handler waits for another Q, block 102. If, however, the timer has expired, block 120, then the adaptive RF link failure handler determines that the state of the RF Link is that the RF Lirk has Failed, block 122. Thus a RF Link Failure is determined by the duration that the Q is below the Q_Threshold.

Once the adaptive RF link failure handler determines the RF Link has Failed, block 122, the adaptive RF link failure handler looks in the memory array for a prior RF Link Failure that occurred in that same area. If a memory element indicates that the RF Link has failed before in that area then the number of failures for that memory element is incremented and the date of failure is updated.

If, however, the RF Link has not failed in that area before then the adaptive RF link failure handler saves in a memory element that a failure occurred, the date that a failure occurred, the location where the failure occurred, the direction of travel when the failure occurred, the velocity of travel when the failure occurred, the frequency of the failure, the state of the memory element set to learning and what action corrected the failure.

Figure 2:
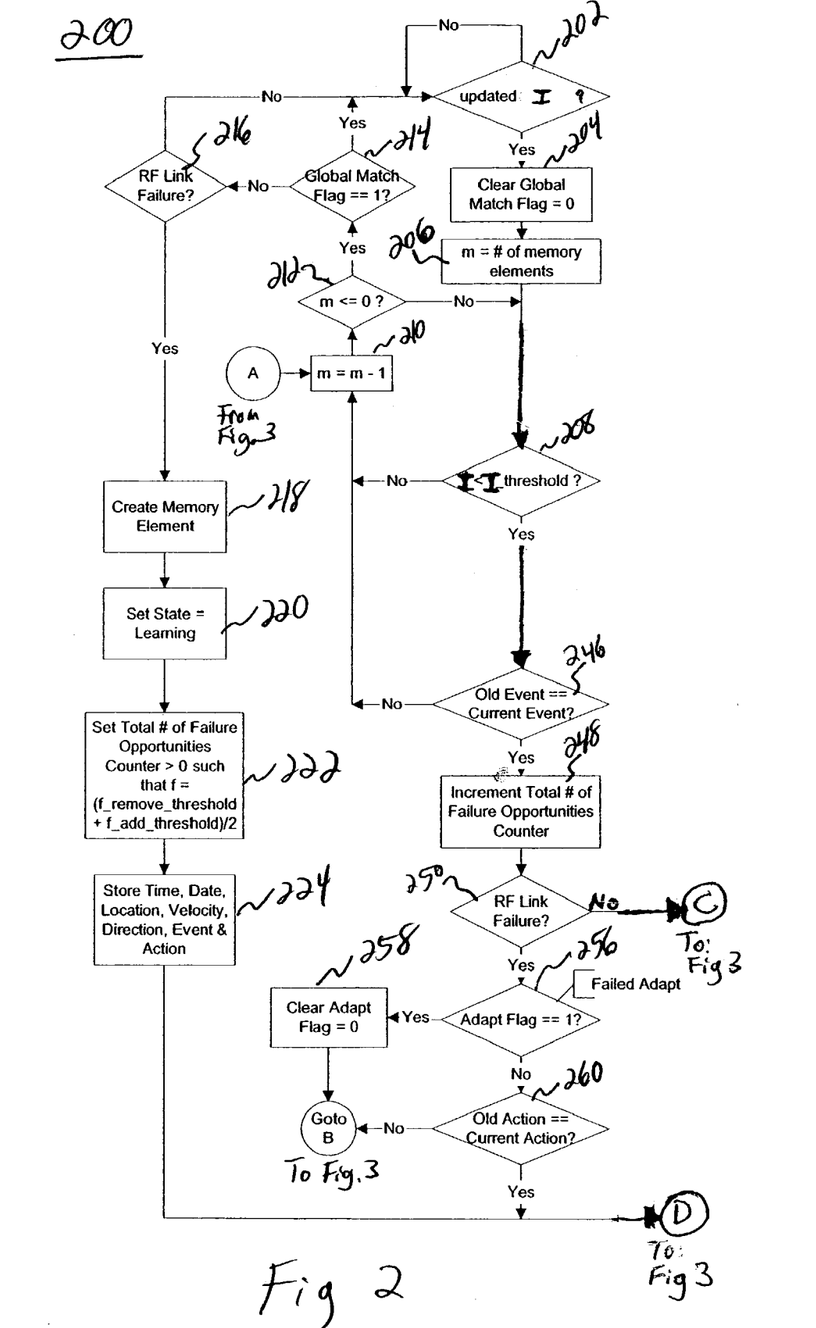
FIGS. 2 and 3 are a flow chart for an adaptive RF link failure handler algorithm showing the learning process.
Figure 3:
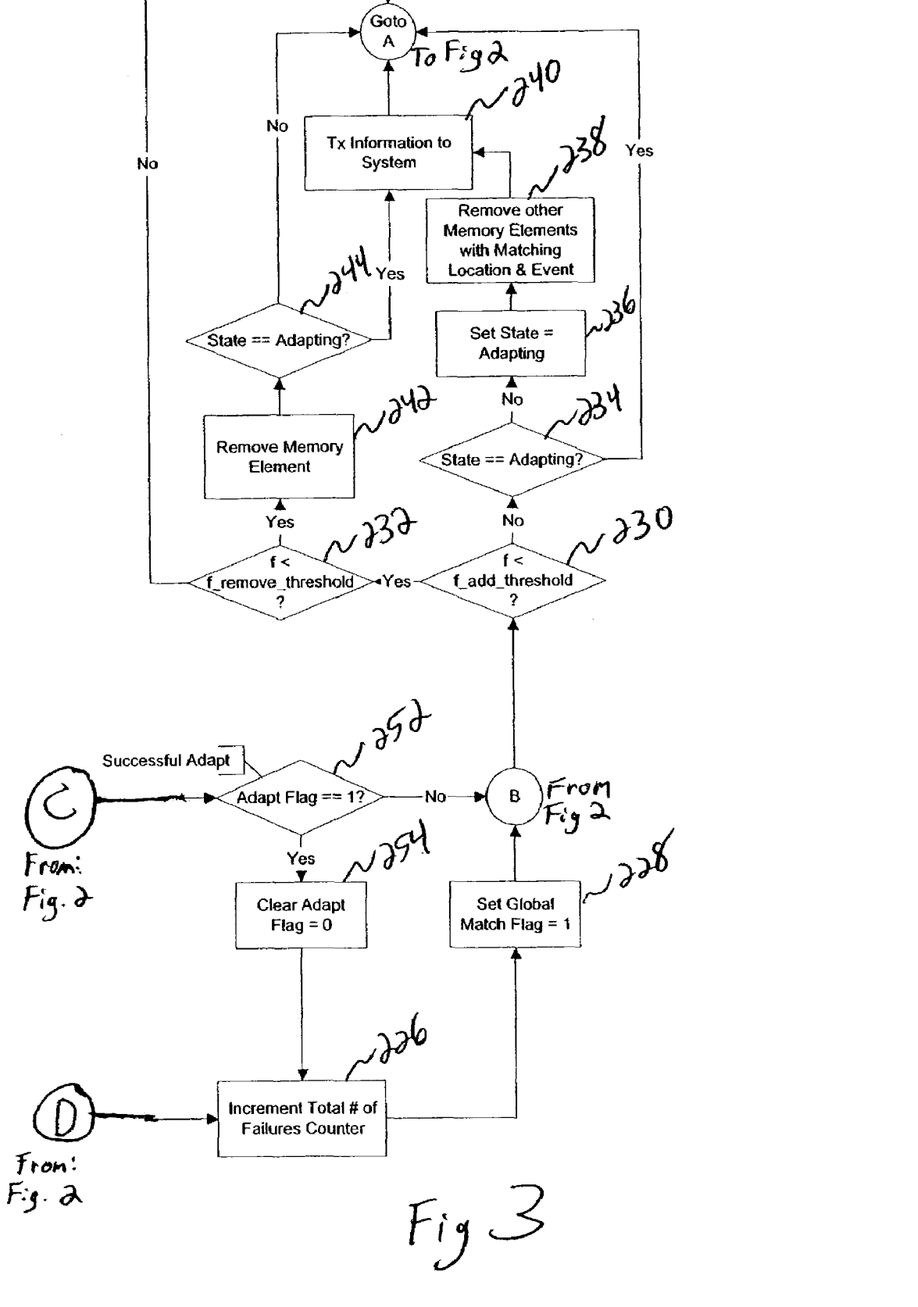

FIGS. 2 and 3 represent a flow chart of a decision Process for Learning 200 by an adaptive RF link failure handler in accordance with one embodiment. In one embodiment the adaptive RF link failure handler is contained in a SU, in another embodiment the adaptive RF link failure handler is contained in a base station, and in yet another embodiment the adaptive RF link failure handler is contained in both a base station and a SU as is described below in conjunction with FIG. 5. The process of FIGS. 2 and 3 may be configured as computer readable code operating on a processor of a SU, a base station, or a combination of a SU and base station.

When a SU containing an adaptive RF link failure handler approaches a location that is contained in a memory element as a location where the RF Link has failed in the past, the adaptive RF link failure handler looks for an updated information (I), block 202. The I, block 202, can be an updated distance from a known failure (d), an updated velocity (v) or an updated direction ($\Phi$), block 202. If an I, block 202, is not available then the adaptive RF link failure handler waits until a new I, block 202, is available. Once an I, block 202, is available, either d, v, or $\Phi$, the adaptive RF link failure handler clears the Global Match Flag, block 204, by setting it to zero and sets memory element counter (m) equal to the number of memory elements available, block 206. The adaptive RF link failure handler then determines whether I is less than the corresponding threshold value for the information I_Threshold, block 208.

For example if the I, block 202, is an updated d then the adaptive RF link failure handler sets I equal to d and I_Threshold equal to d_Threshold. The adaptive RF link failure handler then determines whether the d is less than d_Threshold as expressed by the equation d<d_Threshold where d is the distance between the present location of the SU containing an adaptive RF link failure handler and an event stored in memory as measured by the equation $d=((x-xe)^2+(y-ye)^2+(z-ze)^2)^{1/2}$ and d_Threshold can be any set value representing a distance from the event in memory. The values of x, y and z represent the location of the SU containing an adaptive RF link failure handler in a three dimensional Cartesian coordinate system. The values of xe, ye and ze represent the location of the event stored in memory in a three dimensional Cartesian coordinate system. Thus when an updated d is calculated and found to be less than d_Threshold then the location of the event is considered to be the same as the location in memory.

Similarly, if the I, block 202, is an updated v then the adaptive RF link failure handler sets I equal to v and I_Threshold equal to v_Threshold. The adaptive RF link failure handler then determines whether the absolute value of v minus ve is less then v_Threshold where v is the velocity of the SU containing an adaptive RF link failure handler and ve is the velocity of the SU containing an adaptive RF link failure handler was moving at during an event stored memory and v_Threshold can be any set value representing a velocity stored in memory. This is represented by the equation |v−ve|<v_Threshold.

Finally, if the I, block 202, is an updated $\Phi$ then the adaptive RF link failure handler sets I equal to $\Phi$ and I_Threshold equal to $\Phi$_Threshold. The adaptive RF link failure handler then determines whether the absolute value of $\Phi$ minus $\Phi$e is less then $\Phi$_Threshold where $\Phi$ is the direction of movement of the SU containing an adaptive RF link failure handler and $\Phi$e is the direction of the SU containing an adaptive RF link failure handler was traveling during an event stored in memory and $\Phi$_Threshold can be any set value representing a direction stored in memory. This is represented by the equation |$\Phi$−$\Phi$e|<$\Phi$_Threshold.

For any of the above I, either d, v, or $\Phi$, if the adaptive RF link failure handler determines that I is not less than I_Threshold, block 208, then m is decremented by one, block 210. The adaptive RF link failure handler then determines whether m is less than or equal to zero, block 212, indicating that no more memory elements are available. If m is not less than or equal to zero, block 212, then the adaptive RF link failure handler again determines whether I is less than I_Threshold, block 208, and continues to loop in this manner comparing I to I_Threshold, block 208, until either I is not less than I threshold, block 208, or m has been decremented by one, block 210, until m is less than or equal to zero, block 212.

If, however, the adaptive RF link failure handler determines that m is equal to or less than zero, block 212, the adaptive RF link failure handler then checks the Global Match Flag to determine if it has been set to one, block 214. If the Global Match Flag has been set to one, block 214, then the adaptive RF link failure handler waits for an updated I, block 202. However, if the Global Match Flag has not been set to one, block 214, then the adaptive RF link failure handler determines whether the RF Link has failed, block 216. If the RF Link has not failed, block 216, then the adaptive RF link failure handler waits for an updated I, block 202.

However, if the adaptive RF link failure handler determines RF Link has failed, block 216, the adaptive RF link failure handler creates a new memory element, block 218. The adaptive RF link failure handler then sets the state of the adaptive RF link failure handler to learning, block 220, and sets the total number of failure opportunities counter to greater than zero such that the frequency of an event that is stored in memory (f) is equal to the frequency of an event that the device is adapting to below which the device will notify the network (f_Remove_Threshold) plus the frequency of an event the device is learning about above which the device will notify the network all divided by two, block 222. This can be represented by the equation f=(f_Remove_Threshold+f_Add_Threshold)/2. The adaptive RF link failure handler then stores the time, date location, velocity, direction, event type and action taken in the memory element, block 224. The adaptive RF link failure handler then increments the total number of failures counter, block 226, and sets the Global Match Flag equal to 1, block 228.

Next, the adaptive RF link failure handler determines whether f is less than f_Add_Threshold, block 230. If the adaptive RF link failure handler determines that f is less than f_Add_Threshold, block 230, then the adaptive RF link failure handler determines whether f is less than f_Remove_Threshold, block 232.

If the adaptive RF link failure handler determines that f is not less than f_Remove_Threshold, block 232, then the adaptive RF link failure handler decrements m by one, block 210, and the adaptive RF link failure handler continues from this point on as already described above.

However, if the adaptive RF link failure handler determines that f is not less than f_Add_Threshold, block 230, then the adaptive RF link failure handler determines whether the state is set to adapting, block 234. If the adaptive RF link failure handler determines that the state is set to adapting, block 234, then the adaptive RF link failure handler decrements m by one, block 210, and the adaptive RF link failure handler continues from this point on as already described above.

If, however, the adaptive RF link failure handler determines that the state is not set to adapting, block 234, then the adaptive RF link failure handler sets the state to adapting, block 236, erases other memory elements containing an event with a matching location and event type, block 238, and transmits this information to the network, block 240. Next the adaptive RF link failure handler decrements m by one, block 210, and the adaptive RF link failure handler continues from this point on as already described above.

If, however, the adaptive RF link failure handler determines that f is less than f_Remove_Threshold, block 232, then the adaptive RF link failure handler erases the memory element 242. Next, the adaptive RF link failure handler determines whether the state has been set to adapting, block 244. If the adaptive RF link failure handler determines that the state has not been set to adapting, block 244, the adaptive RF link failure handler determines decrements m by one, block 210, and the adaptive RF link failure handler continues from this point on as already described above.

If, however, the adaptive RF link failure handler determines that the state has been set to adapting, block 244, the adaptive RF link failure handler transmits this information to the network, block 240, decrements m by one, block 210, and the adaptive RF link failure handler continues from this point on as already described above.

If, however, the adaptive RF link failure handler determines that I is less than I_threshold, block 208, the adaptive RF link failure handler determines whether the current event is equal to an old event stored in memory, block 246. If the adaptive RF link failure handler determines that current event is not equal to an old event stored in memory, block 246, the adaptive RF link failure handler decrements m by one, block 210, and the adaptive RF link failure handler continues from this point on as already described above.

If, however, the adaptive RF link failure handler determines that current event is equal to an old event stored in memory, block 246, the adaptive RF link failure handler increments the total number of failure opportunities counter, block 248.

Next the adaptive RF link failure handler determines whether there is an RF Link failure, block 250. If the adaptive RF link failure handler determines there is not an RF Link failure, block 250, and the adaptive RF link failure handler determines whether the adapt flag has been set equal to one, block 252. If the adaptive RF link failure handler determines the adapt flag has not been set equal to one, block 252, then the adaptive RF link failure handler determines whether f is less than f_Add_Threshold, block 230, and the adaptive RF link failure handler then continues from this point on as already described above.

If however, the adaptive RF link failure handler determines the adapt flag has been set equal to one, block 252, which indicates a successful adaptation, then the adaptive RF link failure handler clears the adapt flag by setting it equal to zero, block 254, and increments the total number of failures, block 226, and the adaptive RF link failure handler then continues from this point on as already described above.

If, however, the adaptive RF link failure handler determines there has been an RF Link failure, block 250, the adaptive RF link failure handler then determines whether the adapt flag has been set equal to one, block 256. If the adaptive RF link failure handler determines the adapt flag has been set equal to one, block 256, which indicates a failed adaptation, then the adaptive RF link failure handler clears the adapt flag by setting it equal to zero, block 258, and then the adaptive RF link failure handler determines whether f is less than f_Add_Threshold, block 230, and the adaptive RF link failure handler then continues from this point on as already described above.

If, however, the adaptive RF link failure handler determines the adapt flag has not been set equal to one, block 256, the adaptive RF link failure handler determines whether the current action is equal to an old action stored in memory, block 260. If the adaptive RF link failure handler determines the current action is not equal to an old action stored in memory, block 260, the adaptive RF link failure handler then determines whether f is less than f_Add_Threshold, block 230, and the adaptive RF link failure handler then continues from this point on as already described above. If, however, the adaptive RF link failure handler determines the current action is equal to an old action stored in memory, block 260, the adaptive RF link failure handler then the adaptive RF link failure handler then increments the total number of failures counter, block 226, and the adaptive RF link failure handler then continues from this point on as already described above.

Figure 4:
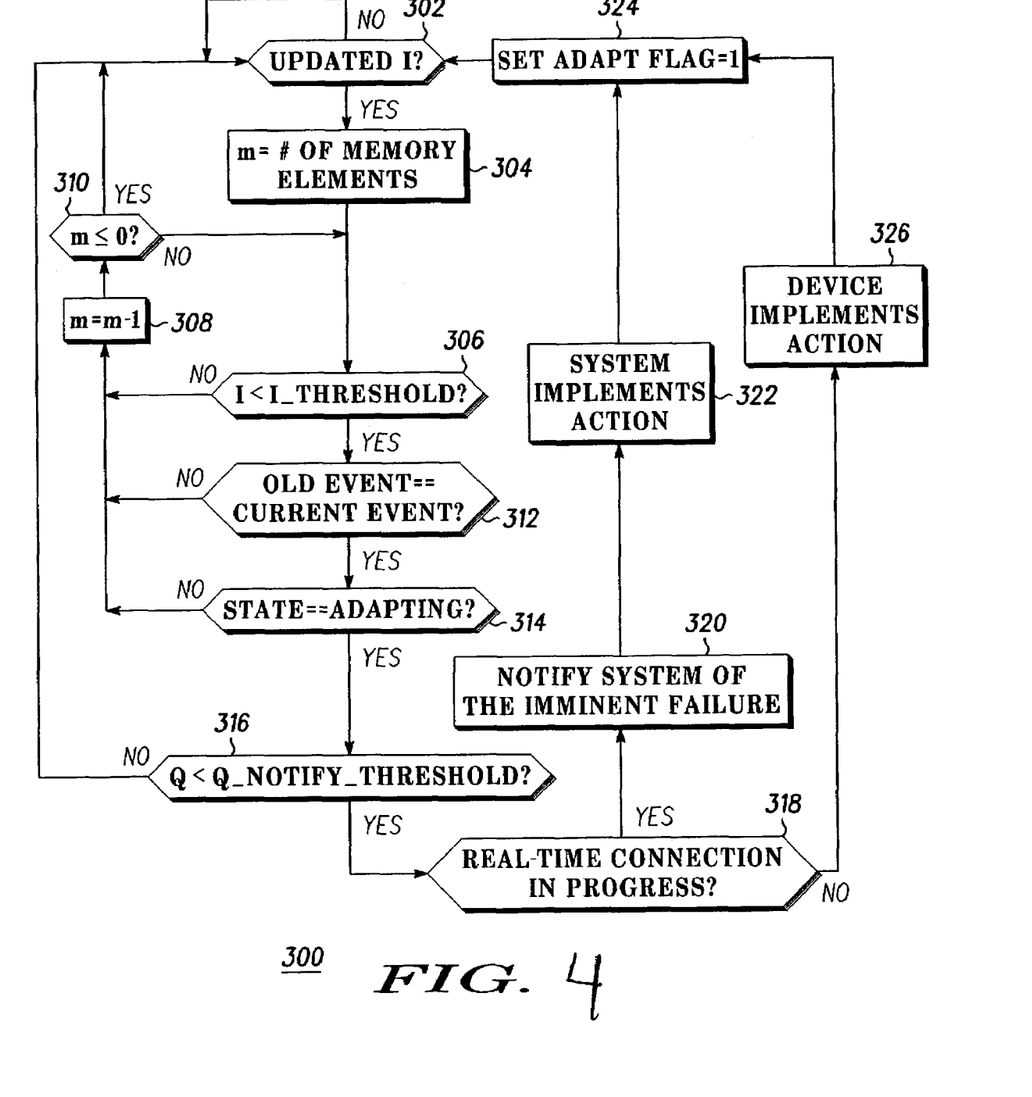
FIG. 4 is a flow chart for an adaptive RF link failure handler algorithm showing the adapting process.

Turning now to FIG. 4 which represents a flow chart of the decision Process for Adapting 300 by an adaptive RF link failure handler in accordance with one embodiment. In one embodiment the adaptive RF link failure handler is contained in a SU, in another embodiment the adaptive RF link failure handler is contained in a base station, and in yet another embodiment the adaptive RF link failure handler is contained in both a base station and a SU as is described below in conjunction with FIG. 5. The process of FIG. 4 may be configured as computer readable code operating on a processor of a SU, a base station, or a combination of a SU and base station.

When a SU containing an adaptive RF link failure handler approaches a location that is contained in a memory element as a location where the RF Link has failed in the past, the adaptive RF link failure handler looks for an updated information (I), block 302. The I, block 302, can be an updated distance from a known failure (d), an updated velocity (v) or an updated direction ($\Phi$), block 302. If an I, block 302, is not available then the adaptive RF link failure handler waits until a new I, block 302, is available. Once an I, block 302, is available, either d, v, or $\Phi$, the adaptive RF link failure handler sets memory element counter (m) equal to the number of memory elements available, block 304. The adaptive RF link failure handler then determines whether I is less than the corresponding threshold value for the information I_Threshold, block 306.

For example if the I, block 302, is an updated d then the adaptive RF link failure handler sets I equal to d and I_Threshold equal to d_Threshold. The adaptive RF link failure handler then determines whether the d is less than d_Threshold as expressed by the equation d<d_Threshold where d is the distance between the present location of the SU containing an adaptive RF link failure handler and an event stored in memory as measured by the equation $d=((x-xe)^2+(y-ye)^2+(z-ze)^2)^{1/2}$ and d_Threshold can be any set value representing a distance from the event in memory. The values of x, y and z represent the location of the SU containing an adaptive RF link failure handler in a three dimensional Cartesian coordinate system. The values of xe, ye and ze represent the location of the event stored in memory in a three dimensional Cartesian coordinate system. Thus when an updated d is calculated and found to be less than d_Threshold then the location of the event is considered to be the same as the location in memory.

Similarly, if the I, block 302, is an updated v then the adaptive RF link failure handler sets I equal to v and I_Threshold equal to v_Threshold. The adaptive RF link failure handler then determines whether the absolute value of v minus ve is less then v_Threshold where v is the velocity of the SU containing an adaptive RF link failure handler and ve is the velocity of the SU containing an adaptive RF link failure handler was moving at during an event stored memory and v_Threshold can be any set value representing a velocity stored in memory. This is represented by the equation |v−ve|<v_Threshold.

Finally, if the I, block 302, is an updated Φ then the adaptive RF link failure handler sets I equal to Φ and I_Threshold equal to Φ_Threshold. The adaptive RF link failure handler then determines whether the absolute value of Φ minus Φe is less then Φ_Threshold where Φ is the direction of the SU containing an adaptive RF link failure handler and Φe is the direction of the SU containing an adaptive RF link failure handler was traveling during an event stored memory and Φ_Threshold can be any set value representing a direction stored in memory. This is represented by the equation |Φ−Φe|<Φ_Threshold.

For any of the above I, block 302, either d, v, or Φ, if the adaptive RF link failure handler determines that I is not less than I_Threshold, block 306, then m is decremented by one, block 308. The adaptive RF link failure handler then determines whether m is less than or equal to zero, block 310, indicating that no more memory elements are available. If m is not less than or equal to zero, block 312, then the adaptive RF link failure handler again determines whether I is less than I_Threshold, block 306, and continues to loop in this manner comparing I to I_Threshold, block 306, until either I is not less than I threshold, block 306, or m has been decremented by one, block 308, until m is less than or equal to zero, block 310.

If, however, the adaptive RF link failure handler determines I is less than I_Threshold, block 306, the adaptive RF link failure handler determines whether the current event is equal to an old event stored in memory, block 312. If the adaptive RF link failure handler determines that current event is not equal to an old event stored in memory, block 312, the adaptive RF link failure handler decrements m by one, block 308, and the adaptive RF link failure handler continues from this point on as already described above.

If, however, the adaptive RF link failure handler determines that current event is equal to an old event stored in memory, block 312, the adaptive RF link failure handler then determines whether the channel quality (Q) is less than the level where the channel is considered to be marginally usable (Q_Notify_Threshold), block 316. If the adaptive RF link failure handler determines that Q is not less than Q_Notify_Threshold, block 316, then the adaptive RF link failure handler waits until a new I, block 302, is available.

If, however, the adaptive RF link failure handler determines that Q is less than Q_Notify_Threshold, block 316, then the adaptive RF link failure handler determines whether there is a real-time connection in progress, block 318. If the adaptive RF link failure handler determines that there is a real-time connection in progress, block 318, then the adaptive RF link failure handler notifies the network of the imminent RF Link failure, block 320, the network implements the current action, block 322, the adapt flag is set equal to one, block 324, and the adaptive RF link failure handler looks for an updated information I, block 302. However, if the adaptive RF link failure handler determines that there is not a real-time connection in progress, block 318, then the adaptive RF link failure handler implements the current action, block 326, the adapt flag is set equal to one, block 324, and the adaptive RF link failure handler looks for an updated information I, block 302.

Figure 5:
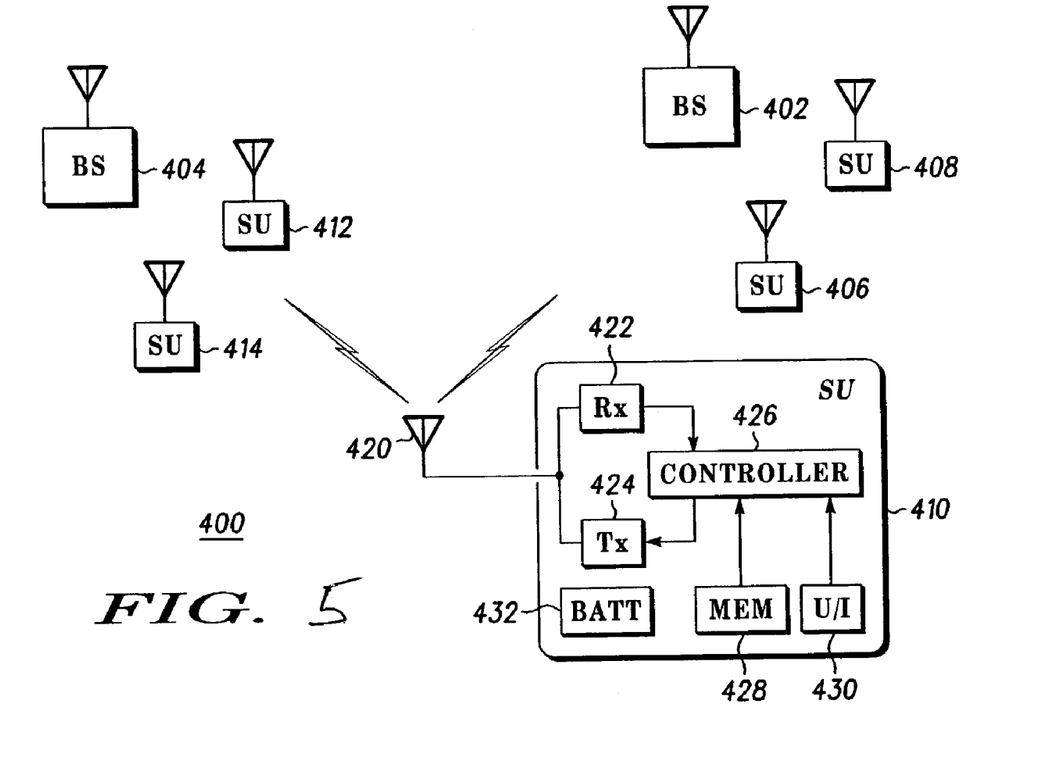
FIG. 5 is a block diagram of a radio telecommunication network.

Turning now to FIG. 5 which represents a block diagram of a system for incorporating an adaptive RF link failure handler for preventing radio frequency (RF) link failure in a radio telecommunication network 400 in accordance with one embodiment. In one embodiment the adaptive RF link failure handler is contained in a SU, in another embodiment the adaptive RF link failure handler is contained in a base station, and in yet another embodiment the adaptive RF link failure handler is contained in both a base station and a SU. The process of FIG. 5 may be configured as computer readable code operating on a processor of a SU, a base station, or a combination of a SU and base station.

The radio telecommunication network 400 includes a plurality of base stations 402, and 404, and a plurality of subscriber units (SUs) 406, 408, 410, 412, and 414. The plurality of base stations 402, and 404 are capable of RF communication with the plurality of SUs 406, 408, 410, 412, and 414. The SUs 406, 408, 410, 412, and 414 may include various components as is shown in greater detail in SU 410. SU 410 shows that SUs may include an antenna 420, a receiver module 422, a transmitter module 424, a controller module 426, a memory module 428, a power source 432, and a user interface 430.

The above adaptive RF link failure handler provides a unique solution for the prevention and elimination of RF link failure in a radio telecommunication network through adaptive failure handling protocols by monitoring the RF link between a base station and a SU to determine if the RF link is failing. If the adaptive RF link failure handler determines the RF link is failing, corrective action is taken to maintain the RF Link. The adaptive RF link failure handler stores information about the RF Link failure and the corrective action taken so that this information can be utilized to prevent future RF Link failures. The adaptive RF link failure handler is also capable of determining that an old corrective action for improving the RF Link channel quality no longer improves the RF Link channel quality and, therefore, can discard the old corrective action in favor of a new corrective action.

It is therefore intended that the foregoing detailed description be regarded as illustrative rather than limiting, and that it be understood that it is the following claims, including all equivalents, that are intended to define the spirit and scope of this invention.

What is claimed is:

1. A cellular subscriber unit (SU) adaptively learning radio frequency (RF) link coverage in a radio telecommunication network, the cellular subscriber unit comprising:
   a memory; and
   a controller coupled to the memory and operable to provide an adaptive RF link failure handler to learn and adapt RF link failure protocols to an RF environment in which the SU is operated, the adaptive RF link failure handler storing coverage information associated with RF link failures in the memory,
   wherein the controller determines that a current RF link failure event is similar to a prior RF link failure event, retrieves a corrective action taken in the prior RF Link failure event; and, implements the corrective action to improve the RF Link channel quality.

2. The cellular subscriber unit of claim 1 further comprising a global positioning system receiver incorporated into the SU capable of accurately determining the SU's location, the coverage information associated with a link failure event including the position of the SU determined by the global positioning system receiver.

3. The cellular subscriber unit of claim 1 wherein when a base station with which the subscriber unit is connected is capable of accurately determining the SU's location and communicating it to the subscriber unit, the coverage information associated with a link failure event including the position of the SU as received from the base station.

4. The system of claim 1 wherein the SU is capable of accurately determining the SU's location with the assistance of the base station, the coverage information associated with a link failure event including the position of the SU.

5. A method for prevention of radio frequency (RF) link failures in a subscriber unit for a radio telecommunication network, the method comprising:
   monitoring in the subscriber unit the RF link between the subscriber unit (SU) and a base station;
   determining in the subscriber unit that the RF link has failed;
   determining the RF Link failure event is similar to a prior RF Link failure event;
   retrieving a corrective action taken in the prior RF Link failure event; and
   attempting to implement the corrective action to improve a RF Link channel quality;
   determining in the subscriber unit that the corrective action improves the RF Link channel quality;
   storing in the subscriber unit information about the failed RF Link, and the corrective action taken to improve the RF Link channel quality; and,
   determining in the subscriber unit that the frequency of an RF link failure event has increased and the corrective action improves channel quality for the increased RF Link failure event.

6. The method of claim 5 further comprising the steps of:
   determining a quality measurement for the RF Link channel;
   comparing the RF Link channel quality measurement to a preset minimum acceptable channel quality;
   determining the RF link channel quality has fallen below the minimum acceptable channel quality;
   determining one or more of a location of the SU, a velocity of the SU or a direction of travel of the SU; and
   comparing the one or more of the location, velocity or direction of travel of the SU when a current RF Link is failing to a prior RF Link failure event stored in memory.

7. A method for prevention of radio frequency (RF) link failures in a subscriber unit for a radio telecommunication network, the method comprising:
   monitoring in the subscriber unit the RF link between the subscriber unit (SU) and a base station;
   determining in the subscriber unit that the RF link has failed;
   determining in the subscriber unit that a corrective action improves the RF Link channel quality;
   storing in the subscriber unit information about the failed RF Link, and the corrective action taken to improve the RF Link channel quality;
   determining in the subscriber unit that the frequency of an RF link failure event has increased and the corrective action improves channel quality for the increased RF Link failure event;
   implementing in the subscriber unit the corrective action and notifying the base Station;
   determining a frequency of an RF link failure event has decreased and a prior corrective action no longer improves channel quality for the decreased RF Link failure event and discarding the corrective action;
   determining in the subscriber unit that the frequency of an RF link failure event has increased and the corrective action improves channel quality for the increased RF Link failure event; and,
   notifying the base station.

8. The method of claim 5 further comprising the step of:
   relaying information about the RF link failure and the corrective action taken from the base station to SU's in an area surrounding and including the RF Link failure event.

9. A method for prevention of radio frequency (RF) link failures in a radio telecommunication network, the method comprising:
   monitoring the RF link between a subscriber unit (SU) and a base station;
   determining the RF link has failed; attempting a corrective action;
   determining the corrective action improves the RF Link channel quality;
   storing information about the failing RF Link and the corrective action taken to improve the RF Link channel quality;
   determining the frequency of an RF link failure event has increased and the corrective action improves channel quality for the increased RF Link failure event;
   implementing the corrective action and notifying the base station; determining a quality measurement for the RF Link channel;
   comparing the RF Link channel quality measurement to a preset minimum acceptable channel quality;
   determining the RF link channel quality has fallen below the minimum acceptable channel quality;
   determining one or more of a location of the SU, a velocity of the SU or a direction of travel of the SU;
   comparing the one or more of the location, velocity or direction of travel of the SU when a current RF Link is failing to a prior RF Link failure event stored in memory;
   determining the current failing RF Link event is similar to a prior RF Link failure event;
   retrieving the corrective action taken in the prior RF Link failure event; and implementing the prior corrective action to improve the RF Link channel quality.

10. The method of claim 9 further comprising the steps of:
determining a frequency of an RF link failure event has decreased and a prior corrective action no longer improves channel quality for the decreased RF Link failure event; and
   discarding the corrective action and notifying the base station.

11. The method of claim 9 further comprising the step of:
   relaying information about the RF link failure and the corrective action taken from the base station to SU's in an area surrounding and including the RF Link failure event.

12. A method for prevention of radio frequency (RF) link failures in a radio telecommunication network, the method comprising:
   monitoring the RF link between a subscriber unit (SU) and a base station;
   determining the RF link has failed; attempting a corrective action;
   determining the corrective action improves the RF Link channel quality;
   storing information about the failing RF Link and the corrective action taken to improve the RF Link channel quality;

determining the frequency of an RF link failure event has increased and the corrective action improves channel quality for the increased RF Link failure event;
implementing the corrective action and notifying the base station; determining a quality measurement for the RF Link channel;
comparing the RF Link channel quality measurement to a preset minimum acceptable channel quality;
determining the RF link channel quality has fallen below the minimum acceptable channel quality;
determining one or more of a location of the SU, a velocity of the SU or a direction of travel of the SU;
comparing the one or more of the location, velocity or direction of travel of the SU when a current RF Link is failing to a prior RF Link failure event stored in memory;
determining the current failing RF Link event is similar to a prior RF Link failure event;
retrieving the corrective action taken in the prior RF Link failure event;
implementing the prior corrective action to improve the RF Link channel quality;
determining a frequency of an RF link failure event has decreased and a prior corrective action no longer improves channel quality for the decreased RF Link failure event; and
discarding the corrective action and notifying the base station.

13. The method of claim 12 further comprising the step of:
relaying information about the RF link failure and the corrective action taken from the base station to SU's in an area surrounding and including the RF Link failure event.

14. A method for prevention of radio frequency (RF) link failures in a radio telecommunication network, the method comprising:
monitoring the RF link between a subscriber unit (SU) and a base station;
determining the RF link has failed;
attempting a corrective action; determining the corrective action improves the RF Link channel quality;
storing information about the failing RF Link and the corrective action taken to improve the RF Link channel quality;
determining the frequency of an RF link failure event has increased and the corrective action improves channel quality for the increased RF Link failure event;
implementing the corrective action and notifying the base station; determining a quality measurement for the RF Link channel;
comparing the RF Link channel quality measurement to a preset minimum acceptable channel quality;
determining the RF link channel quality has fallen below the minimum acceptable channel quality;
determining one or more of a location of the SU, a velocity of the SU or a direction of travel of the SU;
comparing the one or more of the location, velocity or direction of travel of the SU when a current RF Link is failing to a prior RF Link failure event stored in memory;
determining the current failing RF Link event is similar to a prior RF Link failure event;
retrieving the corrective action taken in the prior RF Link failure event;
implementing the prior corrective action to improve the RF Link channel quality;
determining a frequency of an RF link failure event has decreased and a prior corrective action no longer improves channel quality for the decreased RF Link failure event;
discarding the corrective action and notifying the base station; and relaying information about the RF link failure and the corrective action taken from the base station to SU's in an area surrounding and including the RF Link failure event.

* * * * *

UNITED STATES PATENT AND TRADEMARK OFFICE
CERTIFICATE OF CORRECTION

PATENT NO. : 7,489,928 B2
APPLICATION NO. : 10/334472
DATED : February 10, 2009
INVENTOR(S) : Brian K. Smith It is certified that error appears in the above-identified patent and that said Letters Patent is hereby corrected as shown below:

On the Title Page

Item (57), lines 8, 9, 11, 13, 14, under "ABSTRACT", replace "RF Link" with --RF link-- (all occurrences).

In the Claims

Column 10, claim 1, lines 62, 64, replace "RF Link" with --RF link-- (both occurrences).

Column 11, claim 5, lines 21, 22, 23, 26, 28, 30, 31, 34-35, replace "RF Link" with --RF link-- (all occurrences).

Column 11, claim 6, lines 37, 39, 46, 47, replace "RF Link" with --RF link-- (all occurrences).

Column 11, claim 7, lines 56, 58, 59, 62-63, replace "RF Link" with --RF link-- (all occurrences); line 65, after "notifying the base" replace "Station" with --station-- .

Column 12, claim 7, lines 1, 5-6, replace "RF Link" with --RF link-- (both occurrences).

Column 12, claim 8, line 11, replace "RF Link" with --RF link--.

Column 12, claim 9, lines 20, 22, 23, 27, 29-30, 31, 38, 39, 40, 41, 42, 44, replace "RF Link" with --RF link-- (all occurrences).

Column 12, claim 10, line 48, replace "RF Link" with --RF link--.

Column 12, claim 11, line 54, replace "RF Link" with --RF link--.

Column 12, claim 12, lines 63, 65, 66, replace "RF Link" with --RF link-- (all occurrences).

UNITED STATES PATENT AND TRADEMARK OFFICE
CERTIFICATE OF CORRECTION

PATENT NO. : 7,489,928 B2
APPLICATION NO. : 10/334472
DATED : February 10, 2009
INVENTOR(S) : Brian K. Smith It is certified that error appears in the above-identified patent and that said Letters Patent is hereby corrected as shown below:

In the Claims (cont'd)

Column 13, claim 12, lines 3, 5-6, 7, 14, 15, 16, 17, 18, 20-21, 24, replace "RF Link" with --RF link-- (all occurrences).

Column 13, claim 13, line 31, replace "RF Link" with --RF link--.

Column 14, claim 14, lines 3, 4, 5, 9, 11-12, 13, 20, 21, 22, 23, 24, 26-27, 30, 35-36, replace "RF Link" with --RF link-- (all occurrences).

Signed and Sealed this

Twenty-first Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,489,928 B2  Page 1 of 1
APPLICATION NO. : 10/334472
DATED : February 10, 2009
INVENTOR(S) : Smith It is certified that error appears in the above-identified patent and that said Letters Patent is hereby corrected as shown below:

On the Title page,

[*] Notice:  Subject to any disclaimer, the term of this patent is extended or adjusted under 35 USC 154(b) by 300 days Delete the phrase "by 300 days" and insert -- by 563 days --

Signed and Sealed this

Third Day of August, 2010

David J. Kappos
*Director of the United States Patent and Trademark Office*